(12) United States Patent
Katahira

(10) Patent No.: US 12,424,246 B2
(45) Date of Patent: Sep. 23, 2025

(54) ELECTRONIC DEVICE, METHOD OF CONTROLLING ELECTRONIC DEVICE, AND STORAGE MEDIUM

(71) Applicant: CANON KABUSHIKI KAISHA, Tokyo (JP)

(72) Inventor: Yuka Katahira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 18/483,004

(22) Filed: Oct. 9, 2023

(65) Prior Publication Data
US 2024/0144970 A1 May 2, 2024

(30) Foreign Application Priority Data
Nov. 1, 2022 (JP) .................. 2022-175416

(51) Int. Cl.
G11B 27/00 (2006.01)
(52) U.S. Cl.
CPC ................. G11B 27/005 (2013.01)

(58) Field of Classification Search
CPC .................................... G11B 27/005
See application file for complete search history.

(56) References Cited

U.S. PATENT DOCUMENTS

| 10,310,427 | B2 | 6/2019 | Nakanishi | |
|---|---|---|---|---|
| 2015/0109637 | A1* | 4/2015 | Ikeda | G11B 27/105 |
| | | | | 358/1.15 |
| 2018/0103297 | A1* | 4/2018 | Komaba | H04N 1/32657 |
| 2018/0181041 | A1 | 6/2018 | Nakanishi | |

FOREIGN PATENT DOCUMENTS

JP 2018-110305 A 7/2018

* cited by examiner

Primary Examiner — Girumsew Wendmagegn
(74) Attorney, Agent, or Firm — Venable LLP

(57) ABSTRACT

An electronic device includes: a display unit configured to display a guidance video indicating contents of a job; a reception unit configured to receive from a user an instruction to pause the guidance video reproduced on the display unit and an instruction to restart the paused guidance video; and a control unit configured to execute control to change a reproduction speed of the restarted guidance video in a case where the instruction to restart the paused guidance video is received.

13 Claims, 10 Drawing Sheets

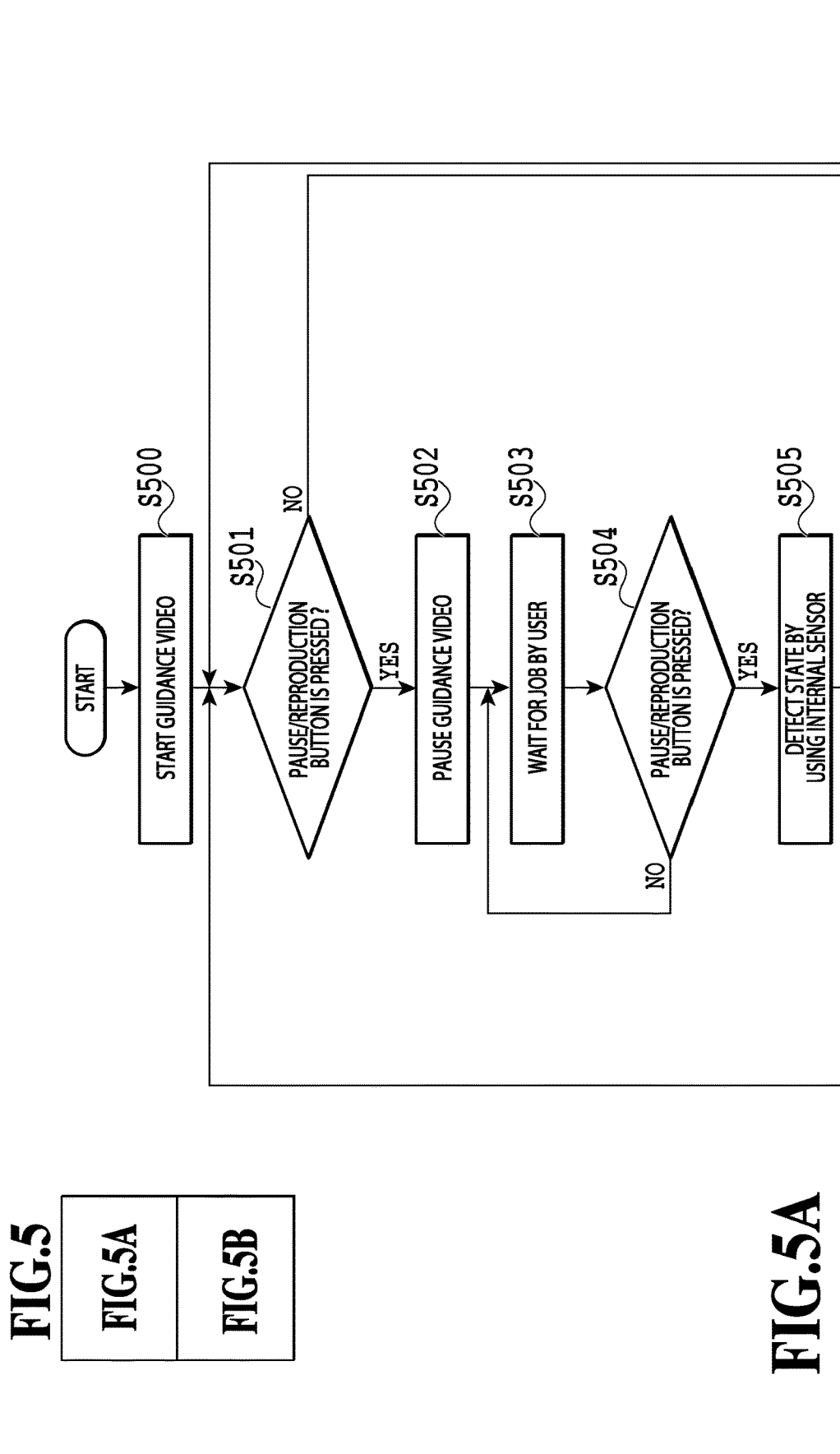

ELECTRONIC DEVICE, METHOD OF CONTROLLING ELECTRONIC DEVICE, AND STORAGE MEDIUM

BACKGROUND OF THE INVENTION

Field of the Invention

The present disclosure relates to an electronic device, a method of controlling the electronic device, and a storage medium.

Description of the Related Art

There has been a technique that allows an electronic device including a display unit such as a liquid crystal panel to display a guidance video, which indicates a procedure of jobs by a user, on the liquid crystal panel. Japanese Patent Laid-Open No. 2018-110305 (hereinafter, referred to as PTL 1) discloses a technique in which, in a case where sheet jamming occurs in a printer, a guidance video of multiple steps indicating a job procedure to resolve the sheet jamming is displayed on a display unit. PTL 1 describes that, after the whole guidance video is repeatedly displayed, and then opening and closing of a cover is detected by an internal sensor, the guidance video of steps except a completed step is repeatedly displayed.

There has been demanded an improvement in the usability while a user checks a guidance video.

SUMMARY OF THE INVENTION

An electronic device according to an aspect of the present disclosure includes: a display unit configured to display a guidance video indicating contents of a job; a reception unit configured to receive from a user an instruction to pause the guidance video reproduced on the display unit and an instruction to restart the paused guidance video; and a control unit configured to execute control to change a reproduction speed of the restarted guidance video in a case where the instruction to restart the paused guidance video is received.

Further features of the present invention will become apparent from the following description of exemplary embodiments with reference to the attached drawings.

BRIEF DESCRIPTION OF THE DRAWINGS

FIG. 5 is a diagram showing the relationship of FIGS. 5A and 5B;

FIGS. 5A and 5B are totally a diagram illustrating an example of a flowchart illustrating processing to display the guidance video;

DESCRIPTION OF THE EMBODIMENTS

Figure 1:
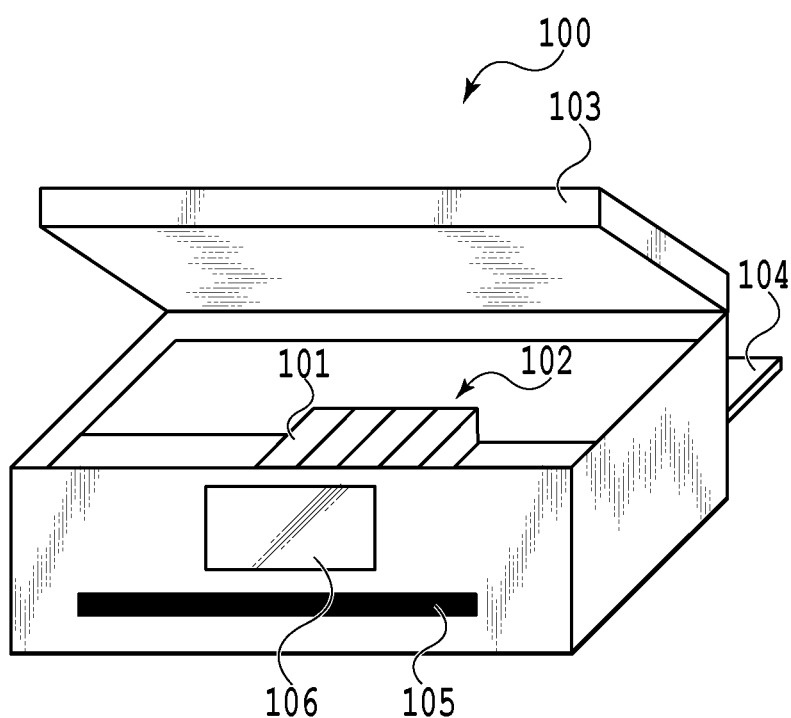
FIG. 1 is a schematic diagram illustrating an exterior of a printing apparatus.

Preferred embodiments of the present disclosure are described below in detail with reference to the appended drawings. Note that, the following embodiments are not intended to limit the matters of the present disclosure, and not all the combinations of the characteristics described in the following embodiments are necessarily required for the means for solving the problems of the present disclosure. Note that, the same reference numerals are given to describe the same configurations.

First Embodiment

<Overview>

The present embodiment is described using a printing apparatus as an example of an electronic device. Additionally, a mode in which sheet jamming (paper jamming) occurs in the printing apparatus, and a guidance video for performing a job to resolve the sheet jamming is displayed on a display unit of the printing apparatus is described as an example.

There is a mode of the guidance video presenting an error resolution procedure to a user in which the same video is repeatedly reproduced and displayed. However, in the mode of repeatedly displaying the guidance video, the user cannot distinguish the last step and the first step depending on the video, and there is a possibility of a deterioration in the usability. Additionally, in a case where the guidance video is long, the user needs to wait until a part of the guidance video that the user wants to check is reproduced again. Moreover, in a case where the guidance video is long, the user may have difficulty with remembering all the displayed operations.

To deal with this, the printing apparatus in the present embodiment is configured to be able to allow the user to pause the guidance video in the middle of the reproduction of the guidance video and to reproduce the paused guidance video. Hereinafter, to reproduce the paused guidance video is simply referred to as "to restart the guidance video". Specifically, the printing apparatus in the present embodiment includes a pause/reproduction button. Additionally, for example, in a case where the guidance video is long, the user presses the pause/reproduction button at a convenient timing. Accordingly, the printing apparatus pauses the guidance video. The user performs a job while checking the paused guidance video, and once completing the job, presses the pause/reproduction button to allow the printing apparatus to restart the guidance video, and checks the next job contents. As it is possible to pause the guidance video as described above, the user can perform the job without remembering the long operation at one time.

As it is possible to pause the guidance video and to restart the paused guidance video as described above, the usability is improved. However, there is demanded a further improvement in the usability.

For example, a case where the user pauses the guidance video and, after performing the job, reproduces the paused guidance video is assumed. In a case where the guidance video is restarted, depending on the situation, the user may be confused because of a relationship between the rate of progression of the guidance video at the point and the job performed by the user. As an example, the video that is displayed in the restarting of the guidance video may be a video of the contents that are about the job already completed by the user. This is because the user and the like who has an experience of dealing with the error in the past may understand a job procedure that should be performed next based on the general job procedure and may perform the job in advance of the video. Like this, in a case where the video that is displayed in the restarting of the guidance video is the video of the contents that are about the job already completed by the user, the user may have a false recognition. In other words, there is a possibility that the user falsely recognizes that the job is not completed even though it is the job already completed by him or herself and performs the completed job again.

On the other hand, a case where the job that should be done originally is not completed by the user in the pausing and the restarting of the guidance video by the user is assumed as well. As an example, a case where a first job and a second job are sequentially performed, and the user pauses the guidance video in the middle of watching a guidance video of the second job subsequent to a guidance video of the first job is assumed. In addition, it is assumed that the user restarts the guidance video while the first job is not completed yet. In this case, since the guidance video of the second job is reproduced as the guidance video at the point of restarting, there is a possibility that the user performs the second job while the first job is not completed yet. In other words, in a case where the job that is already displayed in the guidance video is not completed yet, if the guidance video indicating a job after the job not completed yet is reproduced, there is a possibility that the user performs the next job while the former job is not completed yet. As a result, the user may need to start over the job again.

To deal with this, the printing apparatus of the present embodiment detects the job of the user by a sensor provided therein and determines whether the job instructed by the guidance video is completed to change a reproduction part of the guidance video to be reproduced next. However, the usability may not necessarily be improved even in this case. For example, it is considered that the printing apparatus checks the apparatus state by the sensor detection and skips (fast-rewinds or fast-forwards) the guidance video to a part of the job that the user should work on. In this case, the video is switched to a video of a different scene from that at the pause, and this may make the user confused about whether the user completes the job. There is a method of reproducing again the guidance video including the part of the completed job contents; however, the user still cannot determine from the guidance video whether it is the job already performed by him or herself.

Therefore, in the present embodiment, an example in which the usability is improved by properly controlling the reproduction of the guidance video in accordance with the state of the job performed by the user in a case of restarting the guidance video is described. For example, with a change in a reproduction speed of the guidance video, the user can understand more easily the job instruction by the guidance video. Thus, it is possible to suppress a wrong job performed by the user because of a false recognition by the user.

<Overall Configuration>

FIG. 1 is a schematic diagram illustrating an exterior of a printing apparatus 100, which is an electronic device in the present embodiment. In the present embodiment, a single function printer (SFP) without a reading function (a scanner) is described as an example of the printing apparatus 100. Note that, the printing apparatus 100 may be a multi function printer (MFP) with multiple functions such as a printing function, a reading function, and a transmission function. Additionally, as described above, the electronic device is not limited to the printing apparatus, and anything may be applicable as long as it is an electronic device provided with a display unit.

The printing apparatus 100 includes a carriage 102 to which a detachably attachable ink tank 101 is attached. The printing apparatus 100 includes an openable maintenance cover 103 that allows the user to access the inside of a main body for the job such as ink replacement and sheet jamming resolution. A feeding unit 104 is an insertion port to set various sizes of sheets. The sheets set to the feeding unit 104 are conveyed one by one to a printing unit, and once the printing is completed, the sheet is discharged from a discharging tray 105. An operation panel 106 is provided on an apparatus-outer surface of the printing apparatus 100 and can display information related to the printing apparatus 100 and receive a panel operation by the user. That is, the operation panel 106 is a display unit that displays various types of information and is an operation reception unit that receives various types of operations by the user. The printing apparatus 100 of the present embodiment is configured to be able to receive the panel operation with the user touching the operation panel 106.

<Block Diagram>

Figure 2:
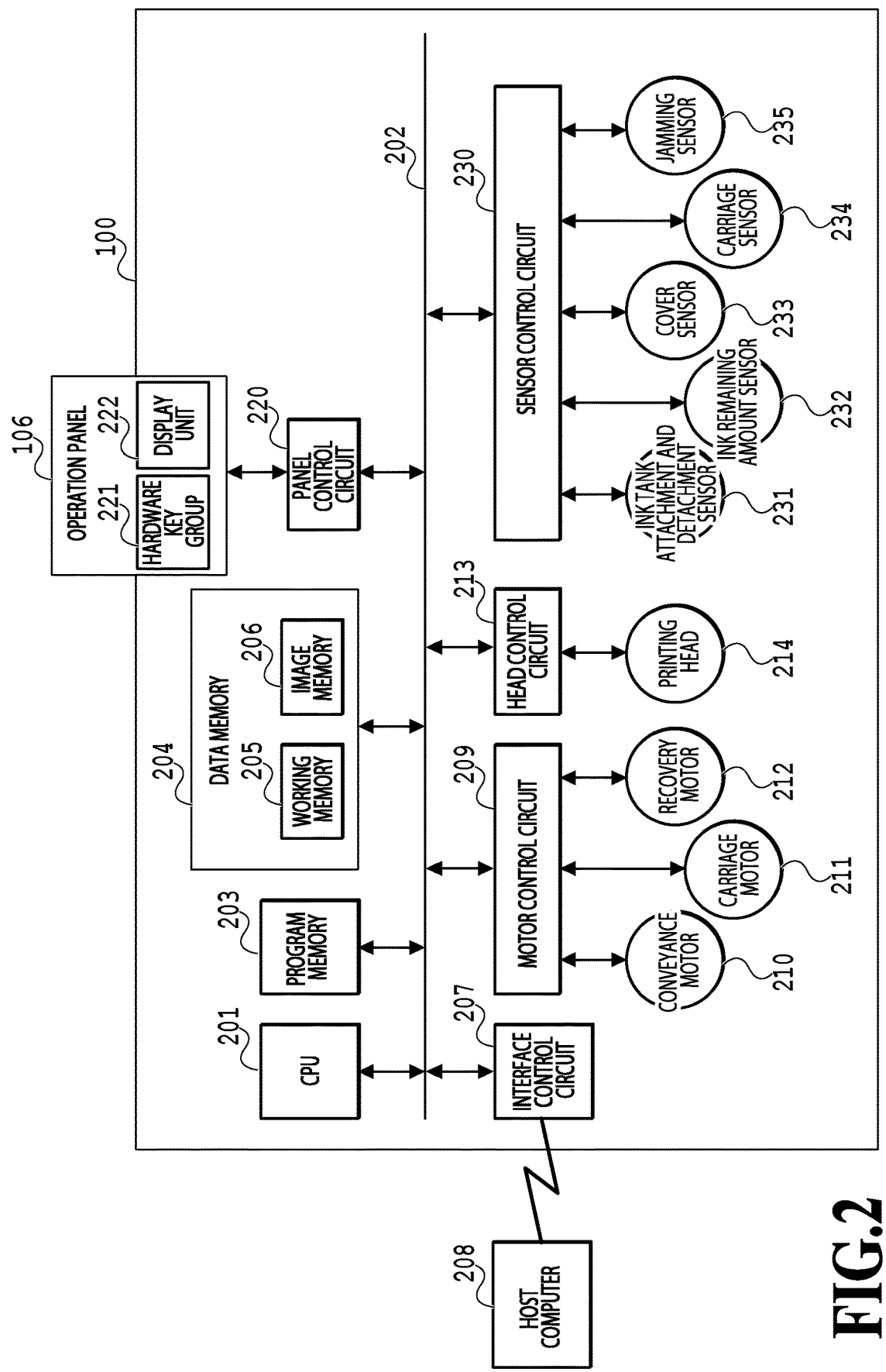
FIG. 2 is a block diagram illustrating a configuration of a control system of the printing apparatus.

FIG. 2 is a block diagram illustrating a configuration of a control system of the printing apparatus 100 in the present embodiment. The printing apparatus 100 includes a CPU 201, an internal bus 202, a program memory 203, a data memory 204, an interface control circuit 207, a motor control circuit 209, a head control circuit 213, a panel control circuit 220, and a sensor control circuit 230. The data memory 204 includes a working memory 205 and an image memory 206. The operation panel 106 includes a hardware key group 221 and a display unit 222. The motor control circuit 209 controls a conveyance motor 210, a carriage motor 211, and a recovery motor 212. The head control circuit 213 controls a printing head 214. The sensor control circuit 230 controls a detection unit including an ink tank attachment and detachment sensor 231, an ink remaining amount sensor 232, a cover sensor 233, a carriage sensor 234, a jamming sensor 235, and the like.

The CPU 201 in the form of a microprocessor operates in accordance with contents of a program and data stored in the program memory 203 in the form of a ROM and the data memory 204 in the form of a RAM that are connected through the internal bus 202. The working memory 205 is a memory used in a case where the CPU 201 executes a control program. The image memory 206 is a memory storing image data to be formed on the sheet. The CPU 201 is configured to control the interface control circuit 207 and to be communicable with a host computer 208 connected through an external interface. By way of the interface control circuit 207, the CPU 201 can receive job data of a printing target from the host computer 208 and can notify the host computer 208 of a status of the printing apparatus. The CPU 201 can control various types of motors that drive a mechanism of the printing apparatus 100 through the motor control circuit 209. The conveyance motor 210 drives not-illustrated feeding roller, conveyance roller, and discharging roller to convey the sheet from the feeding unit 104 to the discharging tray 105. The carriage motor 211 reciprocally drives the carriage 102. The recovery motor 212 drives a not-illustrated head recovery mechanism and performs control in synchronization with the driving of the carriage 102 to execute a recovery operation to secure a proper state of the printing head 214. The CPU 201 can control the printing head 214 through the head control circuit 213 and performs image formation on the sheet by controlling the printing head 214 in synchronization with the reciprocal operation of the carriage 102.

The ink tank attachment and detachment sensor 231 detects the detachment of the ink tank 101 from the carriage 102 by the user and the attachment of the ink tank 101 corresponding to the printing apparatus 100. The ink remaining amount sensor 232 detects an amount of ink remaining inside the ink tank 101. The cover sensor 233 detects that the user opens and closes the maintenance cover 103. The carriage sensor 234 detects the movement of the carriage 102. The jamming sensor 235 detects whether sheet jamming occurs. The ink tank attachment and detachment sensor 231, the ink remaining amount sensor 232, the cover sensor 233, the carriage sensor 234, and the jamming sensor 235 are each formed of a mechanical switch, and the CPU 201 obtains the detected information through the sensor control circuit 230. The CPU 201 controls the operation panel 106 provided on the outer surface of the printing apparatus 100 through the panel control circuit 220. The panel control circuit 220 can display desired information on the display unit 222 arranged on the operation panel 106 and can monitor an operation from the user onto the hardware key group 221 on the same operation panel 106. As mentioned above, the display unit 222 of the operation panel 106 functions as a touch panel display. The hardware key group 221 is provided separately from the display unit 222. Note that, the display unit 222 as the touch panel display may be provided without providing the hardware key group 221, or a configuration in which the display unit 222 does not have the touch panel display function, and the operation by the user is received by the hardware key group 221 may be applicable.

<Guidance Video>

Figure 3:
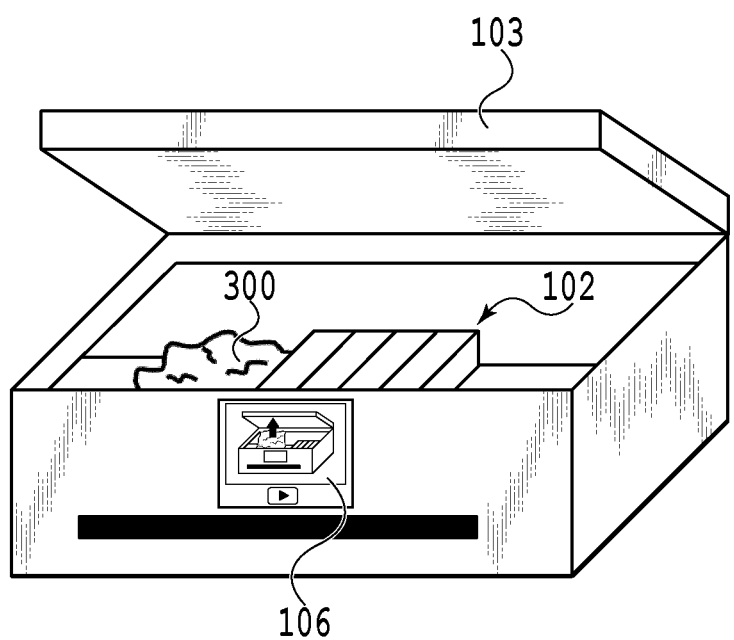
FIG. 3 is a schematic diagram illustrating the exterior of the printing apparatus.

FIG. 3 is a schematic diagram illustrating an exterior of the printing apparatus. FIG. 3 is a diagram in which sheet jamming occurs in the printing apparatus 100, and the CPU 201 reproduces (displays) the guidance video on the operation panel 106 to prompt the user to perform the job. Note that, in the present embodiment, description is given based on an example in which the guidance video is a video of guidance to resolve sheet jamming; however, the guidance video is not limited to this example. The guidance video may be a video in a case where any error occurs that prompts the user to perform a job to return from the error. Additionally, the guidance video is not necessarily limited to the processing to return from an error and may be used for any processing to prompt the user to perform a job. For example, the guidance video can be used in a case of prompting performance of any job including a method of attaching the ink tank 101 in the initial installation. Details of the guidance video are described later.

FIG. 3 illustrates an appearance that the user opens the maintenance cover 103 according to the guidance video displayed on the operation panel 106, and a sheet 300 is rolled into the carriage 102, which causes sheet jamming. The CPU 201 indicates a job procedure to resolve the sheet jamming to the user by reproducing the guidance video on the operation panel 106.

Figure 4A:
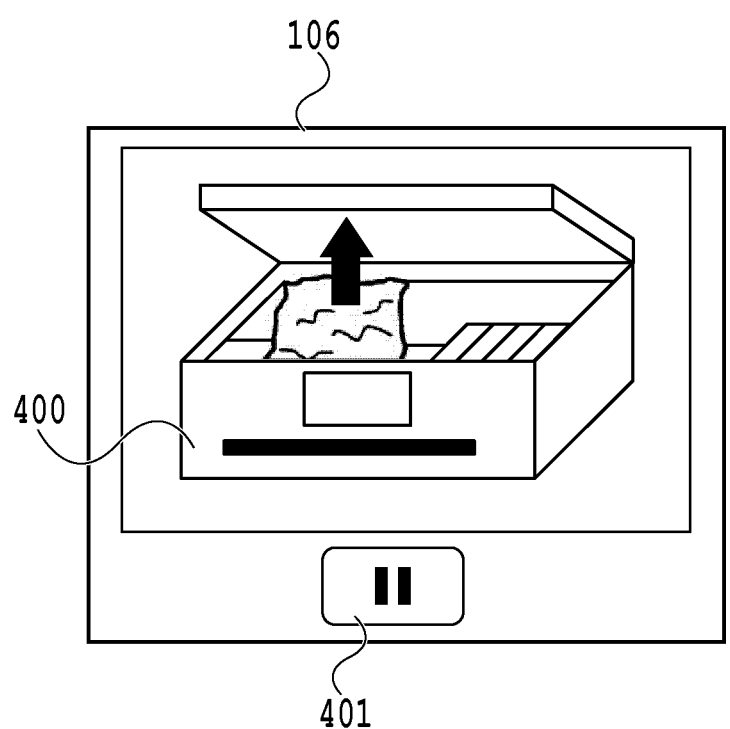
FIGS. 4A and 4B are diagrams describing display control of a guidance video.
Figure 4B:
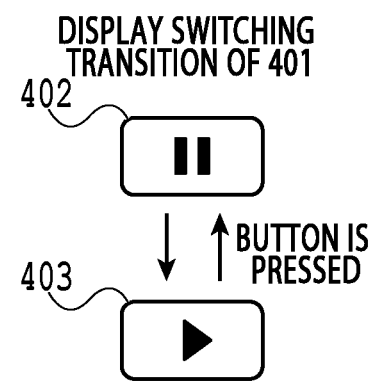

FIGS. 4A and 4B are diagrams describing display control of a guidance video 400. FIG. 4A is a diagram illustrating an example in which the guidance video 400 corresponding to the occurrence of sheet jamming is reproduced and displayed on the operation panel 106. The operation panel 106 in FIG. 4A displays the guidance video 400 and also displays a pause/reproduction button 401. FIG. 4B illustrates an example of a display switching transition of the pause/reproduction button 401. As illustrated in FIG. 4A, the guidance video 400 and the pause/reproduction button 401 to pause or reproduce the guidance video 400 are displayed in the screen of the operation panel 106. The button display aspect of the pause/reproduction button 401 is switched depending on whether the guidance video 400 is being paused or being reproduced. As illustrated in FIG. 4B, in a case where the guidance video 400 is being reproduced, the pause/reproduction button 401 is displayed in the aspect of an in-reproduction button 402. On the other hand, in a case where the guidance video 400 is being paused, the pause/reproduction button 401 is displayed in the aspect of an in-pause button 403. That is, every time the pause/reproduction button 401 is pressed (touched) by the user, to pause or to reproduce the guidance video is switched, and in conjunction with this, the display aspect of the pause/reproduction button 401 itself is also switched. Note that, even though description is given using the aspect of the touch panel display in this case, to pause and to reproduce the guidance video may be switched by pressing a predetermined hardware key.

<Flowchart>

Figure 5B:
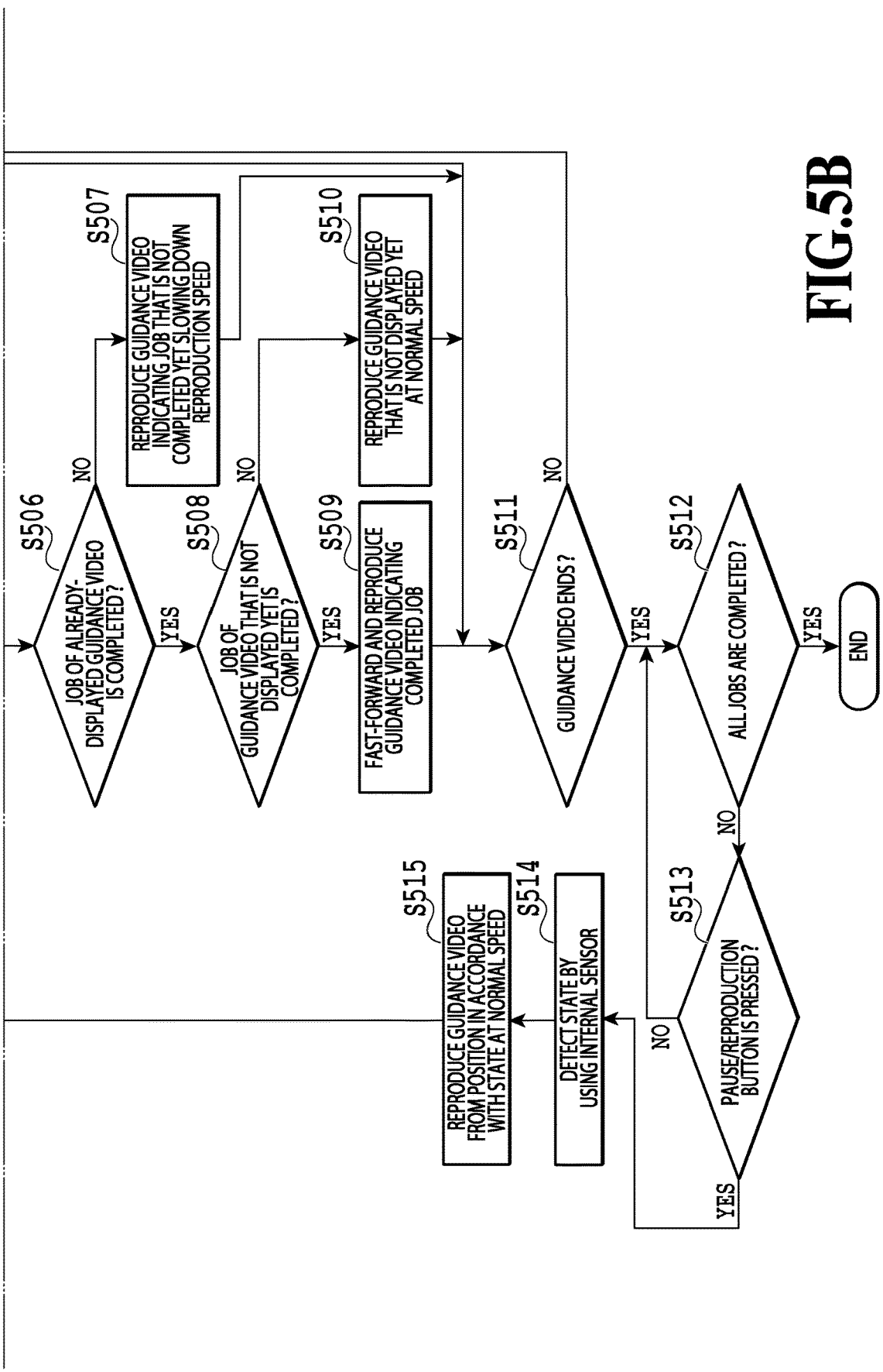

FIGS. 5A and 5B are together a diagram illustrating an example of a flowchart illustrating processing to display the guidance video in a case where the job by the user occurs. The processing in FIGS. 5A and 5B is implemented with the CPU 201 of the printing apparatus 100 reading the program stored in the program memory 203 to the working memory 205 to execute. Note that, a part of or all the functions of the steps in FIGS. 5A and 5B may be implemented by hardware such as an ASIC or an electronic circuit. A sign "S" in each description of processing means that it is a step of the flowchart diagram. The processing in the flowchart illustrated in FIGS. 5A and 5B is processing that is executed in a case where the CPU 201 determines that it is necessary to display the guidance video. For example, in a case where a phenomenon like sheet jamming that needs the job to be performed by the user occurs, the CPU 201 determines that it is necessary to display the guidance video, and the processing in the flowchart illustrated in FIGS. 5A and 5B is started. Alternatively, the processing in the flowchart illustrated in FIGS. 5A and 5B may be started in a case where the printing apparatus 100 receives a user instruction to display the guidance video.

In S500, the CPU 201 starts reproducing the guidance video 400 on the operation panel 106. In S501, the CPU 201 determines whether the pause/reproduction button 401 displayed on the screen of the operation panel 106 is pressed by the user. If it is determined that the pause/reproduction button 401 is not pressed by the user, the CPU 201 allows the process to proceed to S511. If it is determined that the pause/reproduction button 401 is pressed by the user, the CPU 201 allows the process to proceed to S502.

Figure 6:
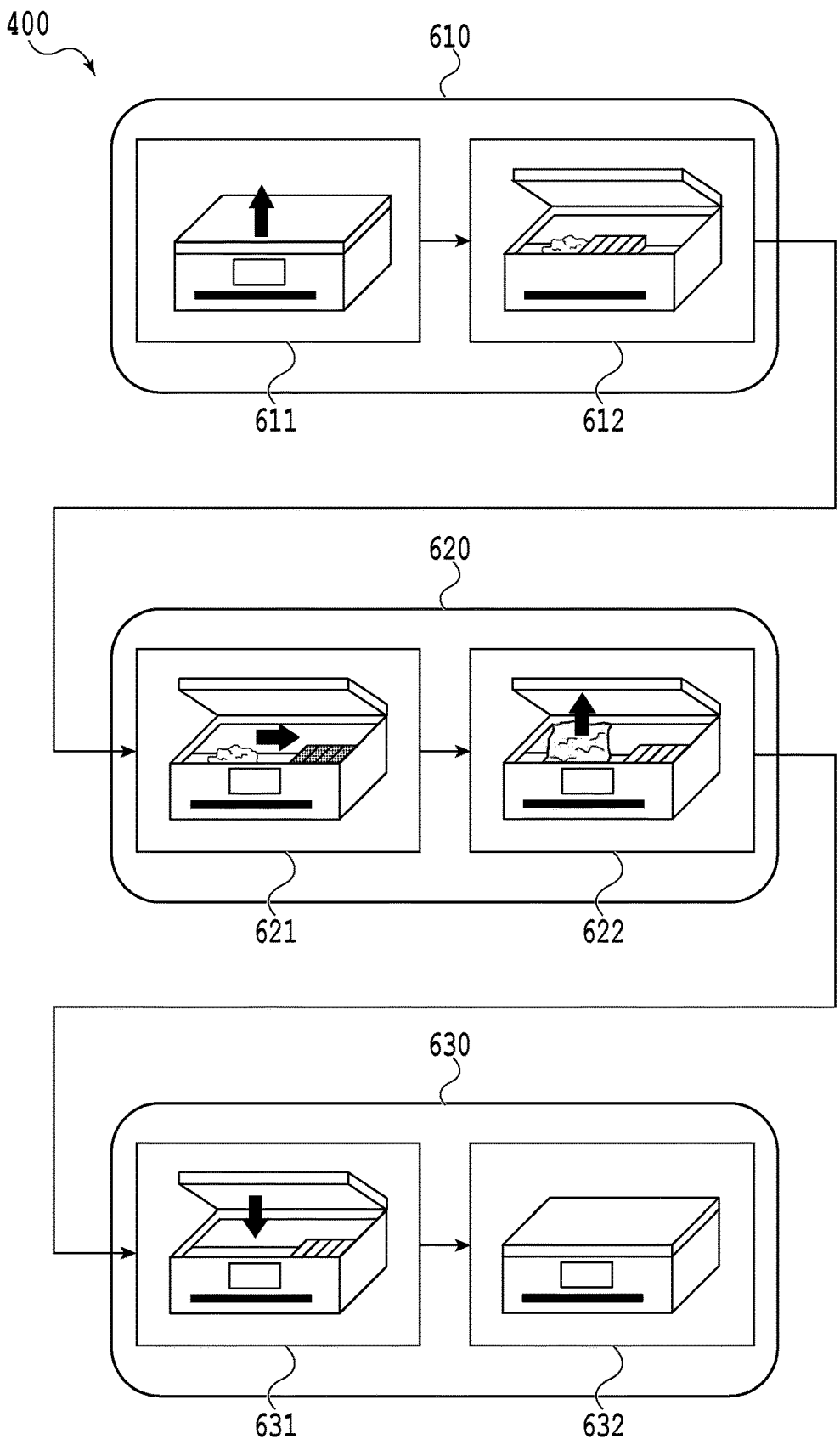
FIG. 6 is a diagram describing the guidance video.

FIG. 6 is a diagram describing the guidance video 400 in the present embodiment. The guidance video in the present embodiment is, as mentioned above, a video instructing the user about a job to deal with a case where sheet jamming occurs. As illustrated in FIG. 6, the guidance video 400 is a video including multiple job steps. That is, the guidance video 400 includes a job procedure of a first step 610, a second step 620, and a third step 630. Additionally, the guidance video 400 is a video in which the second step 620 is started subsequent to the first step 610, and the third step 630 is started subsequent to the second step 620. Each step includes multiple frames. Specifically, the first step 610 includes a first frame 611 and a second frame 612. The second step 620 includes a third frame 621 and a fourth frame 622. The third step 630 includes a fifth frame 631 and a sixth frame 632. Note that, the guidance video 400 illustrated in FIG. 6 is merely an example and is not limited thereto. For example, the frame number may be different depending on the step, and additionally, there may be a step including a single frame.

In the present embodiment, the guidance video 400 illustrated in FIG. 6 is displayed on the screen of the operation panel 106. Additionally, the user can pause the guidance video 400 at any screen (frame). Note that, in a case where the pause/reproduction button 401 is not pressed by the user after the guidance video 400 is displayed, the guidance video is displayed to the last frame (the sixth frame 632) of the third step 630, and then the video is stopped. That is, on the operation panel 106, the sixth frame 632 keeps being displayed while the video is stopped at the sixth frame 632.

Referring back to FIG. 5A, and the description of the processing continues. If it is determined that the pause/reproduction button 401 is pressed by the user, in S502, the CPU 201 pauses the guidance video being reproduced on the operation panel 106. Note that, in a case where the guidance video is paused, the frame of the video at this point keeps being displayed on the operation panel 106. In other words, in a case where the user who checks the guidance video wants to maintain the video indicating the job, the user presses the pause/reproduction button 401. Thus, the guidance video being displayed at this point is paused and keeps being displayed, and therefore the user can proceed with the job checking the paused guidance video. As described above, in the present embodiment, it is assumed that the operation in which the user checks the job contents by pausing the guidance video as needed, thereafter restarts the guidance video as described later, and checks the job contents by pausing again as needed is performed. After S502, the CPU 201 allows the process to proceed to S503.

In S503, the CPU 201 waits for the job by the user. Specifically, the guidance video keeps stopping for a certain period of time until the pause/reproduction button 401 is pressed in S504. It is assumed that, meanwhile, the user performs the corresponding job checking the paused guidance video. After S503, the CPU 201 allows the process to proceed to S504.

In S504, the CPU 201 determines whether the pause/reproduction button 401 is pressed. If it is determined that the pause/reproduction button 401 is not pressed, the process returns to S503, and the processing is repeated. If it is determined that the pause/reproduction button 401 is pressed, the CPU 201 allows the process to proceed to S505.

In S505, the CPU 201 detects the state of the printing apparatus 100 by using an internal sensor. At this point of S505, it is in a state in which the user pauses the guidance video in S502 and thereafter restarts the guidance video. It is expected that, meanwhile, the job performed by the user until the point of the already-reproduced guidance video is completed; however, the job contents performed are various depending on the user. For example, in some cases, depending on the user, the user does not know which job should be performed and restarts the guidance video in that state. On the other hand, in some cases, depending on the user, the user already completes a job of a step that is not reproduced yet, which is further ahead of the already-reproduced part. Thus, since the progress of the job by the user may be changed in a case where the pause/reproduction button 401 is pressed in S504, the CPU 201 detects the state of the printing apparatus 100 by using the internal sensor in S505. Note that, the CPU 201 can figure out the state of the printing apparatus 100 by the various types of sensors. For example, the CPU 201 can detect whether sheet jamming occurs by the jamming sensor 235. Additionally, the CPU 201 can detect whether the maintenance cover 103 is in the open state or in the closed state by the cover sensor 233. In addition, with the combination of these sensor outputs, the CPU 201 can figure out the apparatus state that is, for example, that the maintenance cover 103 is in the open state, and sheet jamming occurs.

Next, in S506, the CPU 201 determines whether the job instructed by the already-displayed guidance video is completed. The guidance video in the present example is a video instructing the job that should be performed by the user. Additionally, each step of the guidance video is associated with information on the job that should be terminated. For example, in the first step 610 illustrated in FIG. 6, the opening of the maintenance cover 103 by the user is the contents of the job that should be terminated. To be more specific, a state in which the sheet jamming is not resolved, and also the maintenance cover 103 is opened is the termination condition of the job in the first step 610. In the second step 620, removing of a sheet of the occurring sheet jamming by the user from the printing apparatus 100 main body is the contents of the job that should be terminated. To be more specific, a state in which the sheet jamming is resolved, and also the maintenance cover 103 is opened is the termination condition of the job in the second step 620. In the third step 630, closing of the maintenance cover 103 by the user is the contents of the job that should be terminated. To be more specific, a state in which the sheet jamming is resolved, and also the maintenance cover 103 is closed is the termination condition of the job in the third step 630.

In S506, based on the state of the printing apparatus 100 detected in S505, the CPU 201 determines whether the job, which is according to the already-displayed job instruction in the frame before the paused frame, is completed. If it is determined that the job instructed by the already-displayed guidance video is completed, the CPU 201 allows the process to proceed to S508. If it is determined that the job instructed by the already-displayed guidance video is not completed, the CPU 201 allows the process to proceed to S507.

In S507, the CPU 201 reproduces the guidance video of the job that is not completed yet slowing down the reproduction speed. That is, the CPU 201 displays the guidance video fast-rewinding to the first frame of the step including the job that is not completed yet. The CPU 201 then reproduces the guidance video at a slower speed (also referred to as a second speed) than a normal speed (also referred to as a first speed). For example, in a case where the guidance video is paused at the third frame 621 of the second step 620, and also the job (the job to open the maintenance cover 103) of the first step 610 is not completed, the CPU 201 fast-rewinds the video to the first frame of the first step 610. Then, the guidance video is reproduced from the first frame 611 of the first step 610 at a slower speed than the normal speed. With a change in the reproduction speed, the user can take time to check the job step that is already displayed and also not completed yet. In the present embodiment, in a case where the guidance video reaches the frame paused in S502 after the guidance video is reproduced at a slower speed than the normal speed in S507, the CPU 201 pauses the guidance video. A case where the processing in S507 is performed is a case where the job is not completed even though the guidance video is displayed once. In this case, it is assumed that an inexperienced user performs the job. Therefore, in the present embodiment, a configuration that prevents the video from advancing to the step ahead by displaying again the video including the step that is not completed yet with the speed being changed and by stopping the video at the frame at which the video is paused before the restart is applied. In the above-described example, after being paused at the third frame 621, the guidance video is reproduced from the first frame 611 changing the reproduction speed, and the guidance video is paused again at the third frame 621.

Note that, in the present embodiment, an example in which the guidance video is paused in a case where the video including the step that is not completed yet is reproduced again in S507, and thereafter the video reaches the frame at which the video is paused in S502 is described; however, it is not limited thereto. The guidance video may keep reproducing to the step ahead without stopping. In this case, the guidance video of the step ahead may be reproduced at the first speed or may be reproduced at the second speed with no change. Additionally, even though an example in which the guidance video is reproduced at a slower speed than the normal speed in S507 is described, the guidance video may be reproduced at the same speed as the normal speed. After S507, the CPU 201 allows the process to proceed to S511.

Next, processing in a case where it is determined that the job instructed by the already-displayed guidance video is completed is described. If it is determined that the job instructed by the already-displayed guidance video is completed, in S508, the CPU 201 determines whether the job of the guidance video that is not displayed yet is completed. For example, in a case where the sheet jamming is already solved while the guidance video is being paused at the third frame 621, the CPU 201 determines that the job of the guidance video that is not displayed yet is completed. If it is determined that the job of the guidance video that is not displayed yet is completed, the CPU 201 allows the process to proceed to S509. If it is determined that the job of the guidance video that is not displayed yet is not completed, the CPU 201 allows the process to proceed to S510.

In S509, the CPU 201 reproduces the guidance video indicating the completed job at a faster speed (also referred to as a third speed) than the normal speed. For example, in a case where the sheet that causes the sheet jamming is already removed while the guidance video is being paused at the third frame 621, the CPU 201 fast-forwards the reproduction of the second step 620. That is, the third frame 621 and the fourth frame 622 are fast-forwarded and reproduced. Thereafter, the CPU 201 reproduces the video of the third step 630 at the normal speed. The guidance video indicating the job already completed is considered that it is originally an unnecessary video for the user. However, in a case of restarting the guidance video after the pause, if the video is switched to a video of a scene different from that of the video before the pause, there is a possibility that the user is confused whether the job is completed and does not know which position the user is at currently. On the other hand, the video indicating the already-performed job is a video that has no value for the user originally. Therefore, in the present embodiment, the CPU 201 reproduces the guidance video indicating the completed job with fast-forwarding, which is faster than the normal speed. Therefore, it is possible to shorten the time to check the necessary video by the user while enabling the user to re-check which position of the current job step the user is at now, and it is possible to improve the usability. After S509, the CPU 201 allows the process to proceed to S511.

On the other hand, if it is determined that the job of the guidance video that is not displayed yet is not completed, in S510, the CPU 201 reproduces the guidance video that is not displayed yet at the normal speed. That is, the CPU 201 reproduces the rest of the paused guidance video at the same speed as that before the pause. For example, in a case where the sheet that causes the sheet jamming is not removed while the guidance video is being paused at the third frame 621, the CPU 201 starts reproducing the second step 620 at the normal speed. That is, the third frame 621 and the fourth frame 622 are reproduced at the normal speed. Thereafter, the CPU 201 reproduces the video of the third step 630 at the normal speed subsequently. After S510, the CPU 201 allows the process to proceed to S511.

In S511, the CPU 201 determines whether the guidance video ends. That is, the CPU 201 determines whether the guidance video is displayed to the last frame. As mentioned above, in a case where the displaying of the guidance video to the last frame is completed, the guidance video is stopped while the last frame is being displayed on the operation panel 106. If it is determined that the guidance video ends, the CPU 201 allows the process to proceed to S512. If it is determined that the guidance video does not end, the CPU 201 allows the process to proceed to S501 and repeats the above-described processing. In other words, the processing after the guidance video is paused and restarted is similar processing as the processing described above. In a case where the pause/reproduction button 401 is pressed again after the guidance video is paused and restarted, the CPU 201 performs the above-described various types of display control in accordance with the state detected by using the internal sensor.

In S512, the CPU 201 determines whether all the jobs instructed by the guidance video are completed. In the example in FIG. 6, in a case where the sheet jamming is resolved, and also the maintenance cover 103 is closed, the CPU 201 determines that all the jobs are completed. If it is determined that all the jobs are completed, the CPU 201 ends the flowchart illustrated in FIGS. 5A and 5B. If it is determined that not all the jobs are completed, the CPU 201 allows the process to proceed to S513.

In S513, the CPU 201 determines whether the pause/reproduction button 401 is pressed. If it is determined that the pause/reproduction button 401 is not pressed, the CPU 201 allows the process to proceed to S512 and repeats the processing. If it is determined that the pause/reproduction button 401 is pressed, the CPU 201 allows the process to proceed to S514.

In S514, the CPU 201 detects the state of the printing apparatus 100 by using the internal sensor. The processing in S514 is similar to the processing described in S505.

Next, in S515, the CPU 201 reproduces the guidance video from the position in accordance with the state detected in S514 at the normal speed. The CPU 201 then allows the process to proceed to S501 and repeats the above-mentioned processing. In other words, in a case where the pause/reproduction button 401 is pressed again after all the steps of the guidance video are reproduced, the guidance video is reproduced from the step that is not completed at the normal speed. The subsequent processing is as described above, and if the pause/reproduction button 401 is not pressed, the guidance video is stopped while the last frame is being displayed. If the pause/reproduction button 401 is pressed, in other words, if the guidance video is paused, the control in which a display aspect is switched in accordance with the state in which the pause/reproduction button 401 is pressed after the guidance video is paused is performed. Note that, in a case where fast-rewinding is performed in S507 after S515, it is possible to set the position from which the reproduction is started in S515 as the position of the fast-rewinding.

Specific Example

Figure 7:
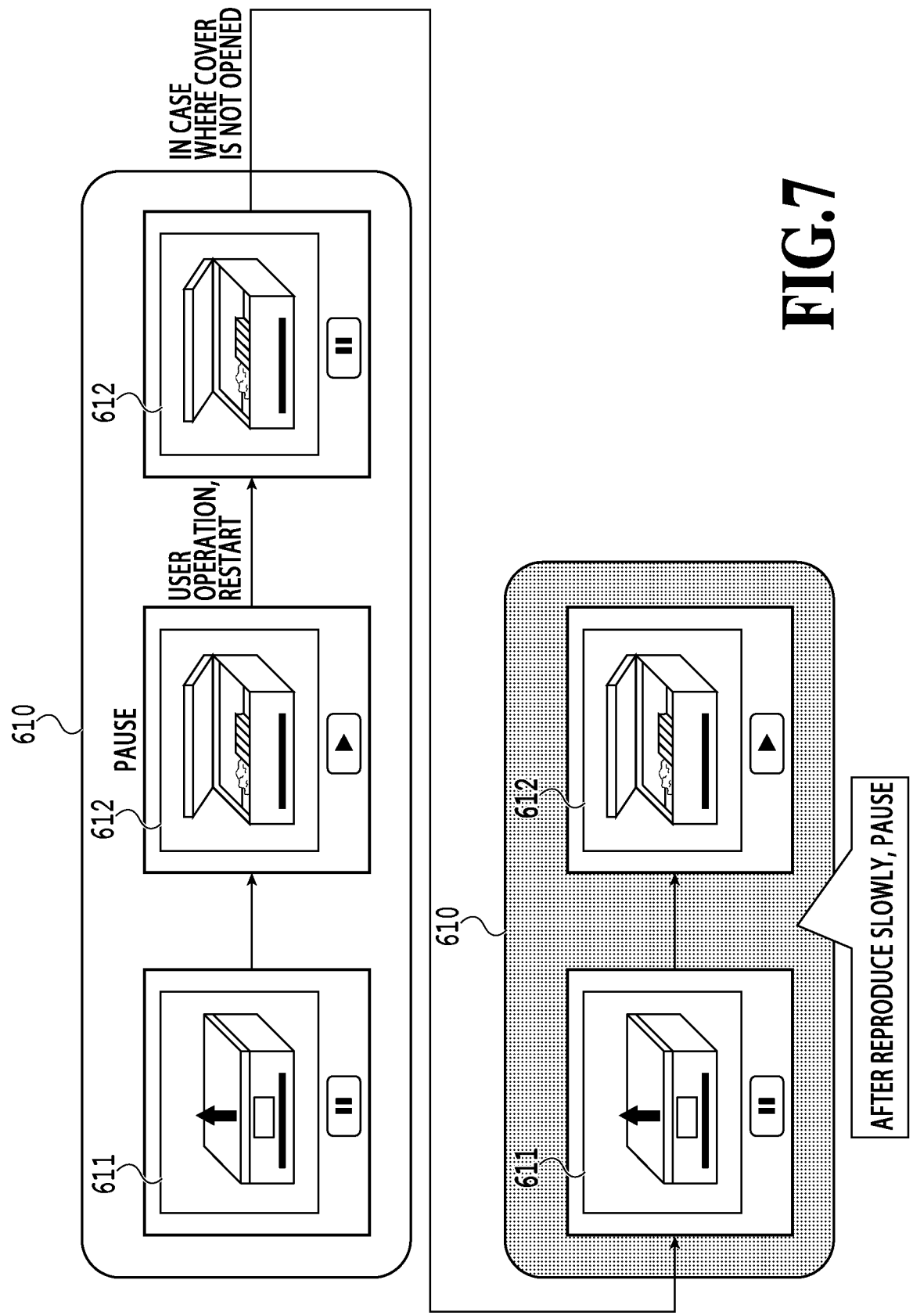
FIG. 7 is a diagram illustrating a specific example of processing in S507.

FIG. 7 is a diagram illustrating a specific example of the processing in S507. That is, FIG. 7 is a diagram illustrating an example in which the guidance video indicating the job that is not completed yet is reproduced at a slower speed than the normal speed.

FIG. 7 illustrates an example of a case in which the user presses the pause/reproduction button 401 in the middle of the reproduction of the first step 610. That is, it is assumed that the user presses the pause/reproduction button 401 at the timing at which the second frame 612 included in the first step 610 is displayed. FIG. 7 illustrates an example in which, with the user pressing the pause/reproduction button 401 again thereafter, the guidance video is restarted. In the example in FIG. 7, the completion condition of the first step 610 is the state in which the maintenance cover 103 is opened; however, in the example in FIG. 7, the user does not perform the job yet. In this case, as described in S507, since the job (in other words, the job to open the maintenance cover 103) instructed by the already-displayed guidance video is not completed, the guidance video is fast-rewound to the first frame (first frame 611) of the first step 610. Then, once the guidance video is reproduced from the first frame 611 at a slower speed than the normal speed, and the paused second frame 612 is displayed, the guidance video is paused. Note that, "fast-rewinding" may be processing of fast-rewinding while the fast-rewinding frame is being displayed on the operation panel 106 or may be processing of fast-rewinding while the fast-rewinding frame is not being displayed on the operation panel 106.

Figure 8:
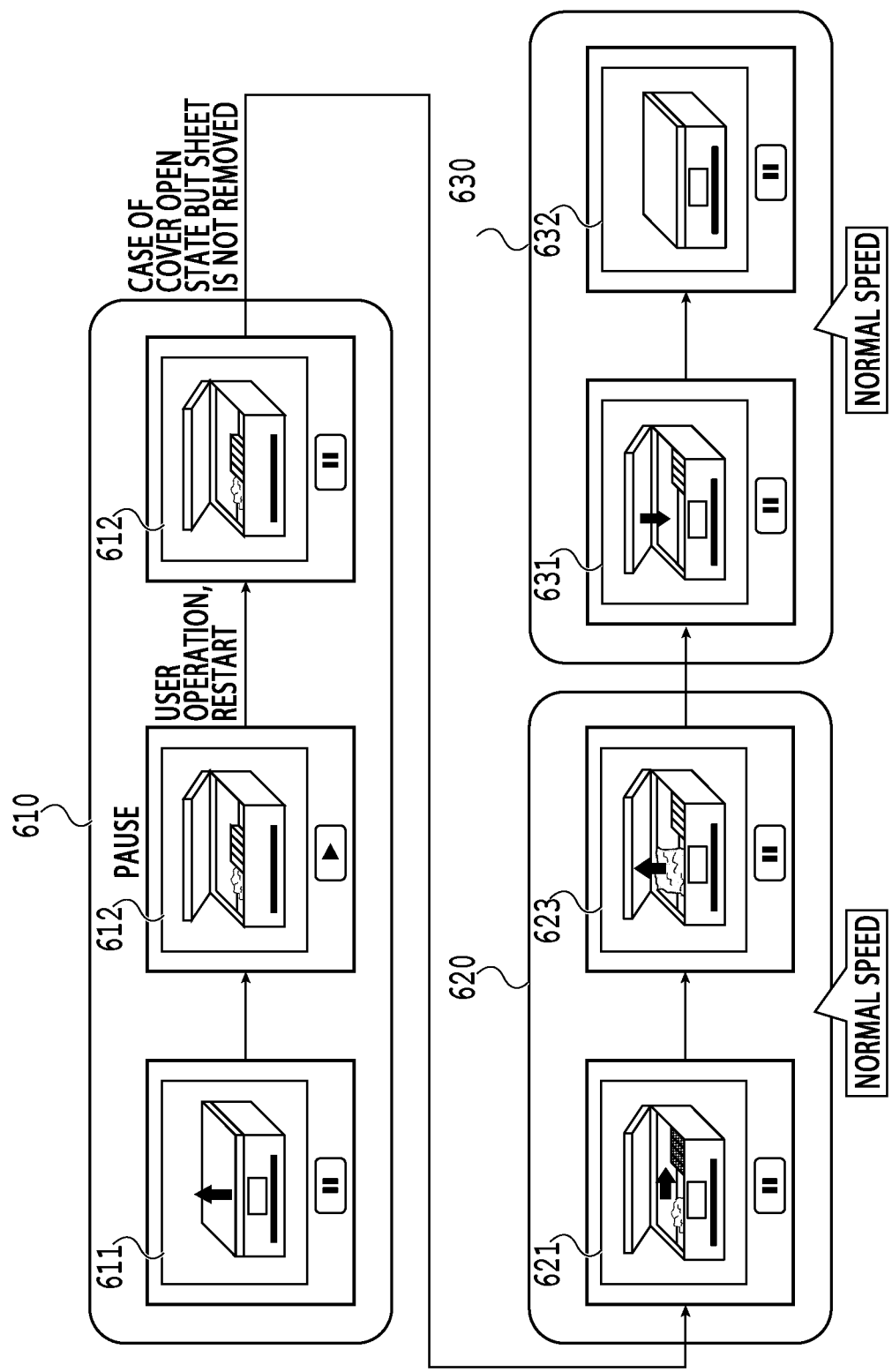
FIG. 8 is a diagram illustrating a specific example of processing in S510.

FIG. 8 is a diagram illustrating a specific example of the processing in S510. That is, FIG. 8 is an example in which the guidance video is reproduced at the same normal speed in a case where the guidance video is restarted while the already-displayed job step is completed, and also the job step that is not displayed yet is not completed. In the example in FIG. 8, the guidance video is also paused with the user pressing the pause/reproduction button 401 while the second frame 612 of the first step 610 is being displayed. With the subsequent user job, the maintenance cover 103 is in the open state. Note that, the sheet that causes the sheet jamming is not removed, and still the sheet jamming occurs. If the user presses the pause/reproduction button 401 again at this timing, the guidance video that is not displayed yet, that is, the video of the third frame 621 and so on subsequent to the second frame 612 is reproduced at the normal speed.

Figure 9:
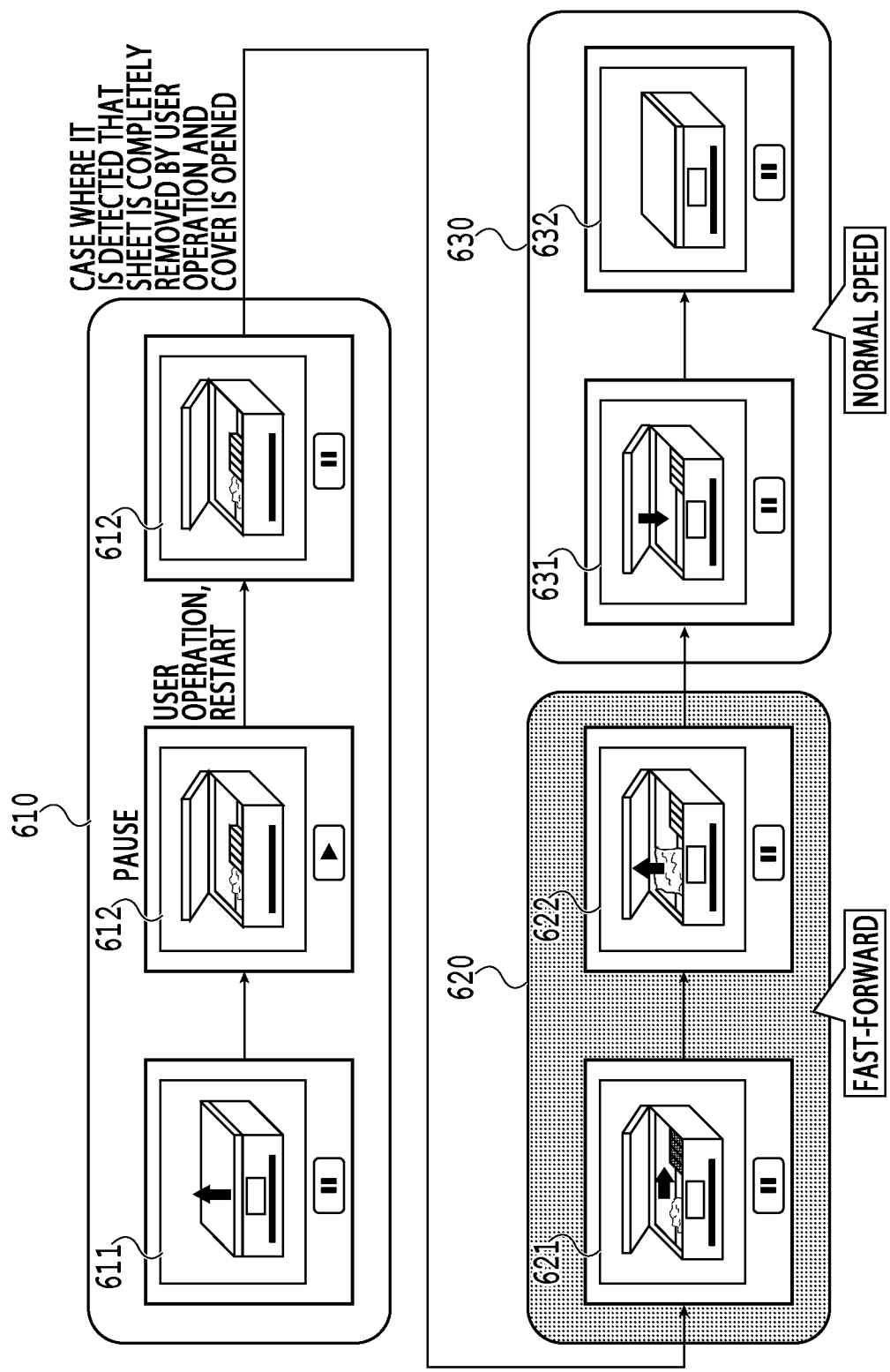
FIG. 9 is a diagram illustrating a specific example of processing in S509.

FIG. 9 is a diagram illustrating a specific example of the processing in S509. That is, FIG. 9 is an example in which, in a case where the guidance video is restarted while the already-displayed job step is completed, and also the job step that is not displayed yet is completed, the job step including the completed job is reproduced at a faster speed than the normal speed. In the example in FIG. 9, with the user pressing the pause/reproduction button 401 while the second frame 612 of the first step 610 is being displayed, the guidance video is paused. With the subsequent user job, the maintenance cover 103 is opened, and additionally it is a state in which the sheet that causes the sheet jamming is removed by the user. Note that, the maintenance cover 103 is in the open state. If the user presses the pause/reproduction button 401 again at this timing, the video of the third frame 621 and so on subsequent to the second frame 612 is reproduced. Out of this video, the video of the completed step (the second step 620) is reproduced at a faster speed than the normal speed. Thereafter, in a case where the step that is not completed (the third step 630) is displayed, the guidance video is reproduced at the normal speed.

As described above, according to the present embodiment, it is possible to improve the usability for the user to check the guidance video. That is, with the pause/reproduction button 401 being provided, the user can check and pause the guidance video at a desired timing and can perform the job in a calm manner. Additionally, it is possible to restart the guidance video at a timing at which the job ends or to pause the guidance video again at a necessary point, and it is possible to perform the job checking the contents each time. Moreover, depending on the user, the completed job may be different in the restarting of the paused guidance video. Therefore, in a case where the paused guidance video is restarted, it is possible to further improve the usability by detecting the state of the apparatus at that point and changing the display aspect during the reproduction of the guidance video.]

Another Embodiment

In the above-described embodiment, an example in which the guidance video is not repeatedly reproduced in certain cycles but the video is stopped in a case where the video reaches the end is described. However, a configuration in which the guidance video waits for a predetermined period of time after reaching the end of the video, and then the reproduction is made again from the beginning automatically may be applicable.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-175416, filed Nov. 1, 2022 which is hereby incorporated by reference herein in its entirety.

What is claimed is:

1. An electronic device comprising:
a display unit configured to display a guidance video indicating contents of a job;
a system comprising (a) one or more processors and/or (b) one or more circuits, the system being configured to function as a plurality of units comprising: (1) a reception unit configured to receive from a user an instruction to pause the guidance video reproduced on the display unit and an instruction to restart the paused guidance video; and (2) a control unit configured to execute control to change a reproduction speed of the restarted guidance video in a case where the instruction to restart the paused guidance video is received,
wherein in a case where the guidance video is reproduced at a first speed before the pause, and a state of the electronic device is a state in which a job indicated by an already-displayed guidance video is completed and also a job indicated by a guidance video that is not displayed yet is completed, the control unit reproduces the guidance video that is not displayed yet and that also indicates the completed job at a second speed faster than the first speed.

2. The electronic device according to claim 1, wherein the plurality of units further comprises a detection unit configured to detect a state of the electronic device, and
wherein the control unit executes control to change the reproduction speed of the restarted guidance video in accordance with a state of the electronic device that is detected by the detection unit.

3. The electronic device according to claim 2, wherein the detection unit includes a plurality of sensors and detects a state of the electronic device in accordance with a combination of information outputted by the sensors.

4. The electronic device according to claim 1, wherein in a case where the guidance video is reproduced at a first speed before the pause, and a state of the electronic device is a state in which a job indicated by an already-displayed guidance video is not completed, the control unit reproduces a video of a part that is already displayed and also that indicates a job that is not completed at a third speed slower than the first speed.

5. The electronic device according to claim 4, wherein the control unit restarts the guidance video from the video of the part that is already displayed and also that indicates the job that is not completed, and after the video of the part indicating the job that is not completed is reproduced at the third speed, the control unit pauses the guidance video at a part at which the guidance video is paused before the restart.

6. The electronic device according to claim 1, wherein in a case where the guidance video is reproduced at a first speed before the pause, and a state of the electronic device is a state in which a job indicated by an already-displayed guidance video is completed and also a job indicated by a guidance video that is not displayed yet is not completed, the control unit reproduces the guidance video that is not displayed yet at the first speed.

7. The electronic device according to claim 1, wherein the control unit reproduces the guidance video that is not displayed yet and that also indicates the completed job at the second speed and subsequently reproduces a guidance video that is not displayed yet and that also indicates a job that is not completed at the first speed.

8. The electronic device according to claim 1, wherein the guidance video includes a plurality of steps and is associated with information indicating termination of a job in each step.

9. The electronic device according to claim 1, wherein in a case where the reception unit receives the instruction to pause the reproduced guidance video, the display unit keeps displaying in a stopped state the guidance video that is being displayed at a point at which the instruction is received.

10. The electronic device according to claim 1, wherein the job is a job to resolve an error that occurs in the electronic device.

11. The electronic device according to claim 10, wherein the electronic device is a printing apparatus, and
wherein the error is an error indicating that a sheet used in the printing apparatus is jammed.

12. A method of controlling an electronic device that includes a display unit configured to display a guidance video indicating contents of a job, the method comprising:
receiving an instruction to pause the guidance video reproduced on the display unit;
receiving from a user an instruction to restart the paused guidance video; and
executing control to change a reproduction speed of the restarted guidance video in a case where the instruction to restart the paused guidance video is received,
wherein in a case where the guidance video is reproduced at a first speed before the pause, and a state of the electronic device is a state in which a job indicated by an already-displayed guidance video is completed and also a job indicated by a guidance video that is not displayed yet is completed, the guidance video that is not displayed yet and that also indicates the completed job is reproduced at a second speed faster than the first speed.

13. A non-transitory computer-readable storage medium storing a program causing an electronic device, including a display unit configured to display a guidance video indicating contents of a job, to:
receive an instruction to pause the guidance video reproduced on the display unit
receive from a user an instruction to restart the paused guidance video; and
execute control to change a reproduction speed of the restarted guidance video in a case where the instruction to restart the paused guidance video is received,
wherein in a case where the guidance video is reproduced at a first speed before the pause, and a state of the electronic device is a state in which a job indicated by an already-displayed guidance video is completed and also a job indicated by a guidance video that is not displayed yet is completed, the guidance video that is not displayed yet and that also indicates the completed job is reproduced at a second speed faster than the first speed.

* * * * *